United States Patent
Kim et al.

(10) Patent No.: US 9,825,267 B2
(45) Date of Patent: Nov. 21, 2017

(54) LITHIUM SECONDARY BATTERY AND METHOD FOR PRODUCING THE SAME

(75) Inventors: Sun-Kyu Kim, Gyeonggi-do (KR); Seung-Don Choi, Daejeon (KR); Hong-Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 1010 days.

(21) Appl. No.: 12/227,005

(22) PCT Filed: May 4, 2007

(86) PCT No.: PCT/KR2007/002206
§ 371 (c)(1),
(2), (4) Date: Apr. 15, 2009

(87) PCT Pub. No.: WO2007/129839
PCT Pub. Date: Nov. 15, 2007

(65) Prior Publication Data
US 2009/0325057 A1   Dec. 31, 2009

(30) Foreign Application Priority Data

May 4, 2006   (KR) .................. 10-2006-0040778

(51) Int. Cl.
*H01M 10/04*   (2006.01)
*H01M 2/14*   (2006.01)
(Continued)

(52) U.S. Cl.
CPC ............. *H01M 2/14* (2013.01); *H01M 2/145* (2013.01); *H01M 2/166* (2013.01);
(Continued)

(58) Field of Classification Search
CPC ............. H01M 2300/0065; H01M 2300/0068; H01M 2300/0072; H01M 2300/0074; H01M 2300/0077
See application file for complete search history.

(56) References Cited

U.S. PATENT DOCUMENTS 5,116,701 A  *  5/1992  Kalisz ................. H01M 2/1673
                                                           429/130
5,437,941 A  *  8/1995  Arledge ................. H01G 9/145
                                                           429/129
(Continued)

FOREIGN PATENT DOCUMENTS

CN          1639887 A        7/2005
JP          10-284065    * 10/1998   .............. H01M 4/04
(Continued)

OTHER PUBLICATIONS

International Search Report issued on Aug. 9, 2007 in connection with corresponding International Application No. PCT/KR2007/002206.
(Continued)

*Primary Examiner* — Ula C Ruddock
*Assistant Examiner* — Amanda Barrow
(74) *Attorney, Agent, or Firm* — Lerner, David, Littenberg, Krumholz & Mentlik, LLP

(57) ABSTRACT

Disclosed is a method for producing a lithium secondary battery including forming an electrode assembly using a cathode, an anode and a separator, introducing the electrode assembly into a battery case, injecting an electrolyte into the battery case, and sealing the battery case, wherein, during assembly of the electrode assembly, insulating particles are dispersed on part of the surface of the separator, or at least one of the cathode and the anode contacting the separator. The step of dispersing insulating particles on the part of the surface of the separator or at least one of the cathode and the anode contacting the separator during battery assembly can considerably reduce short-circuits in a lithium secondary battery caused by intrinsic and extrinsic factors and thus low-voltage defects, and thereby significantly improve yield of a lithium secondary battery.

6 Claims, 2 Drawing Sheets

(51) Int. Cl.
*H01M 2/16* (2006.01)
*H01M 4/04* (2006.01)
*H01M 4/1391* (2010.01)
*H01M 8/1004* (2016.01)

(52) U.S. Cl.
CPC ......... *H01M 2/1646* (2013.01); *H01M 4/043* (2013.01); *H01M 4/0416* (2013.01); *H01M 4/0435* (2013.01); *H01M 4/1391* (2013.01); *H01M 8/1004* (2013.01); *Y10T 29/49108* (2015.01)

(56) References Cited

U.S. PATENT DOCUMENTS

| | | | | |
|---|---|---|---|---|
| 6,084,767 A | * | 7/2000 | Day et al. | 361/512 |
| 6,217,623 B1 | * | 4/2001 | Reichert et al. | 29/623.5 |
| 6,287,720 B1 | * | 9/2001 | Yamashita et al. | 429/131 |
| 6,387,564 B1 | * | 5/2002 | Yamashita | H01M 2/164 29/623.3 |
| 6,387,565 B1 | | 5/2002 | Aihara et al. | |
| 6,447,958 B1 | * | 9/2002 | Shinohara et al. | 429/248 |
| 6,458,487 B1 | * | 10/2002 | Takeuchi et al. | 429/224 |
| 6,475,678 B1 | * | 11/2002 | Suzuki | H01M 2/1653 429/306 |
| 6,511,517 B1 | * | 1/2003 | Ullrich et al. | 29/623.5 |
| 6,562,461 B1 | * | 5/2003 | Clough | B01J 37/349 427/215 |
| 2001/0048583 A1 | * | 12/2001 | Nakada et al. | 361/509 |
| 2003/0099879 A1 | * | 5/2003 | Lee | H01M 10/0431 429/185 |
| 2003/0118913 A1 | * | 6/2003 | Takami et al. | 429/337 |
| 2003/0170542 A1 | * | 9/2003 | Barker | C01B 25/45 429/231.9 |
| 2005/0084761 A1 | | 4/2005 | Hennige et al. | |
| 2005/0106467 A1 | * | 5/2005 | Hambitzer et al. | 429/235 |
| 2005/0186350 A1 | * | 8/2005 | Ratte et al. | 427/372.2 |
| 2005/0255769 A1 | * | 11/2005 | Henninge et al. | 442/59 |
| 2006/0046149 A1 | * | 3/2006 | Yong et al. | 429/251 |
| 2006/0141341 A1 | * | 6/2006 | Nishino et al. | 429/62 |
| 2007/0042270 A1 | * | 2/2007 | Ohata | H01M 2/166 429/246 |
| 2007/0059590 A1 | * | 3/2007 | Hayashi et al. | 429/94 |
| 2007/0082261 A1 | * | 4/2007 | Lee | 429/144 |
| 2008/0274399 A1 | * | 11/2008 | Ohata et al. | 429/142 |

FOREIGN PATENT DOCUMENTS

| | | | | |
|---|---|---|---|---|
| JP | 2000-188134 A | | 7/2000 | |
| JP | 2000-231943 A | | 8/2000 | |
| JP | 2001030778 A | | 2/2001 | |
| JP | 2002-260742 | * | 9/2002 | ............ H01M 10/40 |
| JP | 2002260742 A | | 9/2002 | |
| JP | 2005-183179 | * | 7/2005 | ............. H01M 4/02 |
| JP | 2005183179 A | | 7/2005 | |
| JP | 2005235695 A | | 9/2005 | |
| JP | 2005259639 A | | 9/2005 | |
| KR | 1999-0028977 A | | 4/1994 | |
| KR | 2002-0072770 A | | 9/2002 | |
| KR | 2004-0084943 A | | 10/2004 | |
| KR | 2006-0041649 A | | 5/2006 | |
| WO | 9936981 A1 | | 7/1999 | |
| WO | WO 2004/107479 | * | 12/2004 | ............. H01M 2/14 |
| WO | WO 2005/057700 | * | 6/2005 | ............. H01M 8/02 |
| WO | WO/2005/057712 | * | 6/2005 | ............ H01M 10/04 |
| WO | WO 2005/078828 | * | 8/2005 | ............. H01M 4/02 |
| WO | WO 2006/018921 | * | 2/2006 | ............. H01M 4/02 |

OTHER PUBLICATIONS

Office Action in corresponding Chinese Patent Application No. 200780024257.9 on Sep. 30, 2010.

* cited by examiner

LITHIUM SECONDARY BATTERY AND METHOD FOR PRODUCING THE SAME

CROSS REFERENCE TO RELATED APPLICATIONS

The present application is a national phase entry under 35 U.S.C. §371 of International Application No. PCT/KR2007/002206, filed May 4, 2007, published in English, which claims priority from Korean Patent Application No. 10-2006-0040778, filed May 4, 2006, all of which are incorporated herein by reference.

TECHNICAL FIELD

The present invention relates to a method for producing a lithium secondary battery, which shows an improved yield by reducing generation of defects in a step of forming an electrode assembly during the manufacture of a battery, and a lithium secondary battery obtained by the same method.

BACKGROUND ART

In general, lithium secondary batteries can be manufactured via various assembling processes and include wound, laminated and stacked batteries. For example, in the case of a laminated lithium secondary battery, electrode slurry containing an electrode active material optionally with a binder and a conductive agent is applied onto a current collector to provide a cathode and an anode individually. Then, the cathode and the anode are stacked on both sides of a separator to form an electrode assembly with a desired shape, and the electrode assembly is inserted into a casing and sealed to provide a finished battery. A lithium secondary battery obtained by the above-mentioned method may cause an internal short circuit between both electrodes due to internal or external factors during the assemblage of the battery, for example, in a step of stacking (laminating) a cathode, a separator and an anode successively. Such an internal short circuit is followed by generation of low-voltage defects after a formation step, which is performed after the assembling step in order to activate a battery by subjecting it to charge/discharge cycles. As a result, the yield of desired finished batteries decreases.

DISCLOSURE OF THE INVENTION

Technical Problem

Therefore, the present invention has been made in view of the above-mentioned problems. The inventors of the present invention have studied to examine factors causing a drop in yield during a process for manufacturing a lithium secondary battery and to find a novel method for improving the yield.

As a result, the inventors of the present invention have found that when an electrode assembly is formed by distributing or scattering insulating powder onto a surface of a separator or that of an electrode facing to the separator, it is possible to significantly reduce generation of an internal short circuit caused by external or internal factors and generation of low-voltage defects, and thus to significantly improve yield of desired batteries. The present invention is based on this finding.

Technical Solution

The present invention provides a method for producing a lithium secondary battery, the method comprising the steps of: (a) distributing or scattering insulating powder partially or totally onto a surface of at least one of a cathode, an anode and a separator; (b) forming an electrode assembly by using the cathode, the anode and the separator; and (c) introducing the electrode assembly into a casing and sealing the casing.

Also, the present invention provides a lithium secondary battery (preferably a lithium polymer secondary battery), which comprises an electrode assembly received in a casing, wherein the electrode assembly includes at least two unit cells, each unit cell including: (i) a full cell including a first electrode, a first separator and a second electrode; or (ii) a bicell including a first electrode, a first separator, a second electrode, a second separator and a first electrode, and further includes a third separator interposed between one unit cell and another unit cell, the lithium secondary battery being characterized in that insulating powder is distributed or scattered partially or totally onto a surface of at least one of the first electrode, the second electrode, the first separator, the second separator and the third separator.

Hereinafter, the present invention will be explained in more detail.

The present invention is characterized by forming an electrode assembly including preliminarily formed constitutional elements (e.g. a cathode, an anode and a separator), wherein insulating powder is uniformly scattered or distributed partially or totally onto a surface of the separator or at least one electrode facing to the separator.

The insulating powder is present uniformly between at least one electrode and the separator in the electrode assembly (see FIG. 2). Therefore, both electrodes hardly experience a complete short circuit caused by internal and external factors, so as to inhibit a short circuit in an electrode assembly and generation of low-voltage defects. Even when a short circuit occurs in the electrode assembly, the insulating powder prevents both electrodes from being in direct contact with each other and inhibits a shorted region from extending to a larger dimension.

Additionally, according to the prior art, there has been an attempt to introduce an electrode or a separator, obtained by using metal oxide particles for forming or coating the electrode or separator, to a battery in order to prevent generation of an internal short circuit between both electrodes caused by internal or external factors. However, since the battery is finished via a process including the steps of individually forming the electrodes and the separator containing a metal oxide and introducing them into the battery, the process according to the prior art requires a long period of time. Also, additional processing steps for manufacturing the electrodes and separator are required.

On the contrary, according to the present invention, it is possible to improve the safety, quality and production yield of batteries to the same degree as the conventional battery including an electrode or separator using metal oxide particles for forming or coating the same, by scattering insulating powder onto both electrodes and/or a separator during a step of assembling a battery. Further, it is possible to reduce the time required for manufacturing batteries and to simplify the processing steps, and thus to realize mass production and to improve cost-efficiency.

The lithium secondary battery according to the present invention can be manufactured by a conventional method known to those skilled in the art, except that an electrode assembly is formed by scattering insulating powder onto a preliminarily formed electrode and/or separator.

(1) Step of Scattering Insulating Powder Partially or Totally onto Surface of at Least One of Cathode, Anode and Separator There is no particular limitation in shape, content and structure of the insulating powder, as long as the insulating powder is an electrically insulating material, which is distributed on the surface of the electrode and/or separator to prevent the cathode and the anode from being in direct contact with each other, or, if any, to inhibit conduction of electric current between both electrodes.

The insulating powder has en electric resistance of $10^6$ ohm cm or higher, preferably of $10^{12}$~$10^{20}$ ohm cm. However, the scope of the present invention is not limited thereto.

The insulating powder may be distributed onto the surface of at least one of the electrodes and/or separator. It is preferred that the insulating powder is scattered on the surface of an electrode in order to accomplish a firm bonding with a separator. Meanwhile, dendrite formed on the surface of an anode in needle-like forms due to lithium precipitation is a main cause of a microshort. Thus, it is more preferred that the insulating powder is applied onto the anode, because the problem of microshort can be significantly reduced or inhibited.

The insulating powder that may be used in the present invention includes conventional insulator or semiconductor particles known to those skilled in the art. Non-limiting examples of such insulating powder include $MgO$, $TiO_2$, $Li_4Ti_5O_{12}$, $ZrO_2$, $InSnO_2$, $Al_2O_3$, $SiO_2$, $GeO_2$, $MoO$, $SnO$, $Cr_2O_3$, $Sb_2O_3$—$SnO_2$ or a mixture thereof. Herein, the insulating powder may contain a certain amount of water in itself. Thus, if desired, the insulating powder is dewatered via a drying step before use.

The insulating powder may have a particle diameter (size) controlled adequately in such a range that the safety and yield of a battery can be improved. For example, the insulating powder has a particle diameter of 20 nm~1 μm, but is not limited thereto. Additionally, there is no particular limitation in content of the insulating powder scattered on the surface of an electrode or a separator, because the content depends on the size and density of the particles. Preferably, the insulating powder is used in an amount of 0.1~10 parts by weight based on 100 parts by weight of an electrode active material.

The insulating powder is scattered onto the surface of at least one of the electrodes to form an insulating powder layer. The insulating powder layer may have a thickness controlled in a range known to those skilled in the art. Preferably, the insulating powder has a thickness of 20 nm~5 μm. If the insulating powder layer is too thin, it is difficult to apply the layer uniformly and to obtain desired effects satisfactorily. On the other hand, if the insulating powder layer is too thick, the internal resistance of a battery increases and the energy density of a battery decreases. Also, such physically poor characteristics inhibit easy assemblage of a battery.

Additionally, the insulating powder layer may have a pore structure by virtue of interstitial volumes among the insulating particles, so that the space to be impregnated with an electrolyte increases. Therefore, the electrode has an improved degree of swelling with an electrolyte so as to facilitate lithium ion conduction. Also, such improved lithium ion conductivity results in an improvement in the quality of a battery.

Further, since the electrode has an improved degree of swelling with an electrolyte, formation of dendrite caused by lithium precipitation at a portion partially non-swelled with an electrolyte in a conventional electrode can be significantly reduced. As a result, it is possible to significantly reduce generation of an internal short circuit during the assemblage of a battery and to significantly inhibit defects of microshort caused by the partial dendrite formation.

There is no particular limitation in methods for scattering insulating powder onto a separator and/or electrode, and any method known to those skilled in the art may be used. For example, scattering can be performed by using a fine net or sieve or by applying an impact via vibration. Scattering using a sieve vibration system is preferred.

In one embodiment of the methods for scattering insulating powder, a powder scattering system or a sieve vibration system is mounted to a path through which an electrode passes, so that the powder (particles) can be distributed on the electrode. In a variant, a preliminarily formed electrode is allowed to pass through a system including insulating powder so that the insulating powder can be distributed on the electrode. Herein, the system including the insulating powder may comprise a member for spraying the insulating powder, disposed at the top thereof; a member for collecting the sprayed insulating powder, disposed at the bottom thereof; and a conveying line (e.g. conveyor belt) through which the electrode can move and the insulating powder sprayed onto the electrode can pass, the conveying line being disposed between the above two members. In this case, the insulating powder sprayed from the top is scattered onto the electrode conveyed along the conveying line, while the remaining powder that is not distributed on the electrode is collected at the bottom.

The insulating powder, which is scattered on a separator and/or electrode as described above, is used in an amount of 2 μg/cm²~50 mg/cm² per unit area, but is not limited thereto. The above range corresponds to the insulating layer distributed on an electrode to a thickness of 20 nm~5 μm in a ratio of about 20%-80%.

There is no particular limitation in the cathode or anode onto which the insulating powder is applied, and any cathode or anode currently used in a lithium secondary battery may be used.

Additionally, there is no particular limitation in the separator used in combination with the electrodes. However, a separator capable of adhesion via hot fusion is preferred. The separator that may be used in the present invention includes a microporous separator or a microporous separator having a gelled polymer coating layer thereon, and non-limiting examples thereof include a polymer film for a solid polymer electrolyte, a polymer film for a gelled polymer electrolyte, a polymer film coated with a gelled polymer coating layer.

(2) Step of Forming Electrode Assembly by Using Cathode, Anode and Separator

The separator and/or electrode onto which insulating powder is scattered as described above may be assembled according to a conventional method known to those skilled in the art to provide an electrode assembly. Non-limiting examples of such methods include a lamination or stacking process, a folding process, a winding process, etc.

To maintain continuous adhesion between a separator and an electrode to be assembled into an electrode assembly, the separator and the electrode are preferably joined with each other via hot fusion. For example, insulating powder is scattered onto at least one of the electrodes to be in contact with the separator, and then the electrodes and the separator are joined with each other via hot fusion.

Herein, there is no particular limitation in temperature and pressure ranges during the hot fusion. For example, a temperature of 60° C.~100° C. and a pressure of 1 kgf~5 kgf may be used. Also, hot fusion may be performed in a conventional manner known to those skilled in the art, for example, by allowing electrodes and a separator to pass through a roll laminator at a temperature of 60° ° C.~100° C.

The electrode assembly according to the present invention may be provided in the form of a full cell, a bicell, or a stacked cell using at least two unit cells, each unit cell being a full cell or a bicell.

Herein, the term "full cell" means an electrochemical cell including a first electrode, a first separator and a second electrode. The term "bicell" means an electrochemical cell including a first electrode, a first separator, a second electrode, a second separator and a first electrode, wherein an electrode having one type of polarity is interposed between electrodes having the other type of polarity. Additionally, a stacked cell may include at least two unit cells, each unit cell being a full cell or a bicell and a third separator being interposed between one unit cell and another unit cell. Preferably, at least one unit cell formed of a full cell or a bicell is stacked with another unit cell and a separator is interposed between the unit cells (see FIGS. 1 and 2). Herein, each of the first electrode and the second electrode is a cathode or an anode.

Then, the electrode assembly formed as described above is introduced into a battery casing, which is a can generally known to those skilled in the art. There is no particular limitation in the shape of the battery casing and particular examples thereof include a cylindrical battery casing, a coin-like battery casing, a prismatic battery casing or a pouch-like battery casing.

(3) Step of Injecting Electrolyte

The electrolyte that may be used in the present invention includes a non-aqueous electrolyte containing an electrolyte salt dissolved in an organic solvent, a polymer gel electrolyte comprising a solid solution of an electrolyte, or an organic solvent containing an electrolyte salt dissolved therein and supported on a polymer, or a polymer solid electrolyte. There is no particular limitation in selection of the electrolyte.

The electrolyte may be comprised of a conventional organic solvent and an electrolyte salt. The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof. A lithium salt is particularly preferred.

The organic solvent that may be used in the present invention includes a conventional solvent known to those skilled in the art, such as cyclic carbonates and/or linear carbonates. Non-limiting examples of the organic solvents include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethyoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a mixture thereof. Halogen derivatives of the above organic solvents may also be used.

The polymer gel or polymer solid electrolyte may include the above-mentioned electrolyte provided in the form of a solid solution in a polymer. Non-limiting examples of the polymer that may be used include: polyether ring-containing polymers, such as polyethylene oxide or polypropylene oxide; polyester ring-containing polymers, such as polyethylene succinate or polycaprolactam; polyamine ring-containing polymers, such as polyethylene imine; polysulfido ring-containing polymers, such as polyalkylene sulfide; or the like. It is also possible to use a polymer electrolyte obtained by supporting the above non-aqueous electrolyte onto a polymer, such as polyvinylidene fluoride, polyvinylidene fluoride-tetrafluoroethylene copolymer, polyethylene oxide, polyacrylonitrile, polypropylene oxide, etc., and by plasticizing the polymer.

Injection of the electrolyte may be performed in an adequate step during the manufacture of a battery depending on the particular process for manufacturing a finished battery and physical properties required for a finished battery. In other words, injection of the electrolyte may be performed before the assemblage of a battery or in the final step during the assemblage of a battery.

The lithium secondary battery obtained as described above may be further subjected to a formation step and an aging step, if desired, and then is sealed to provide a finished battery. Herein, the formation step includes repeating charge/discharge cycles of a battery after the assemblage of the battery in order to activate the battery. In the formation step, a solid electrolyte interface (SEI) film may be formed on an anode. Additionally, the aging step is for stabilizing such an activated battery for a predetermined period of time.

The present invention provides a lithium secondary battery obtained by the above-mentioned method.

The lithium secondary battery includes an electrode assembly received in a casing, wherein the electrode assembly includes at least two unit cells, each unit cell comprising: (i) a full cell comprising a first electrode, a first separator and a second electrode; or (ii) a bicell comprising a first electrode, a first separator, a second electrode, a second separator and a first electrode, and further includes a third separator interposed between one unit cell and another unit cell, the lithium secondary battery being characterized in that insulating powder is scattered partially or totally onto a surface of at least one of the first electrode, the second electrode, the first separator, the second separator and the third separator.

The lithium secondary battery according to the present invention refers to a secondary battery capable of repeating charge/discharge cycles by way of lithium, intercalation/deintercalation or insertion/deinsertion. Particular examples of the lithium secondary battery include a lithium metal secondary battery, a lithium ion secondary battery, a lithium polymer secondary battery or a lithium ion polymer secondary battery. A lithium polymer battery is preferred.

In fact, it can be seen that the lithium secondary battery including insulating powder scattered on an electrode and/or separator during the manufacture of a battery according to the present invention significantly reduces generation of an internal short circuit, as compared to a conventional lithium secondary battery. Additionally, it can be seen from the following experimental examples that the method for manufacturing a lithium secondary battery according to the present invention reduces generation of low-voltage defects, and thus improves yield of desired batteries (see the following Table 1).

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
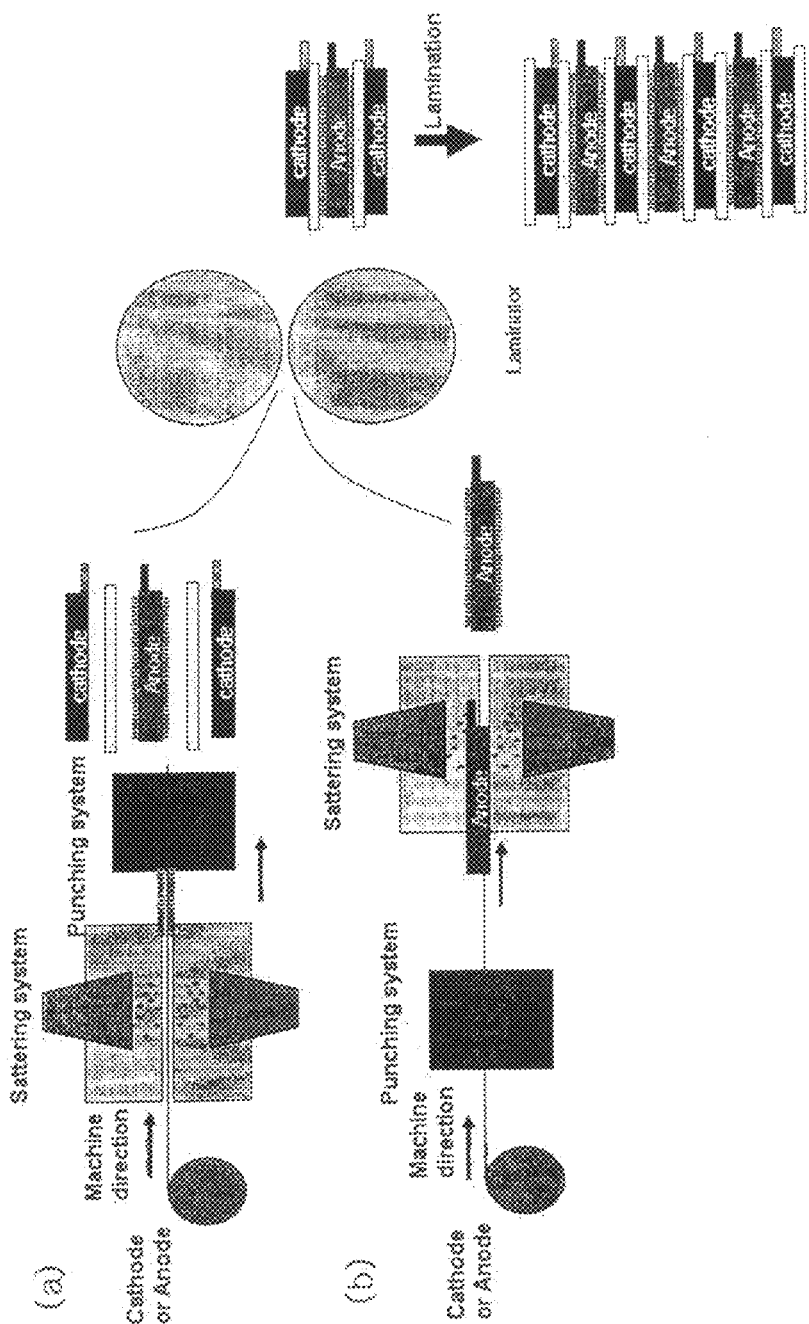
FIG. 1 is a schematic view showing the method for producing a lithium secondary battery according to the present invention.
Figure 2:
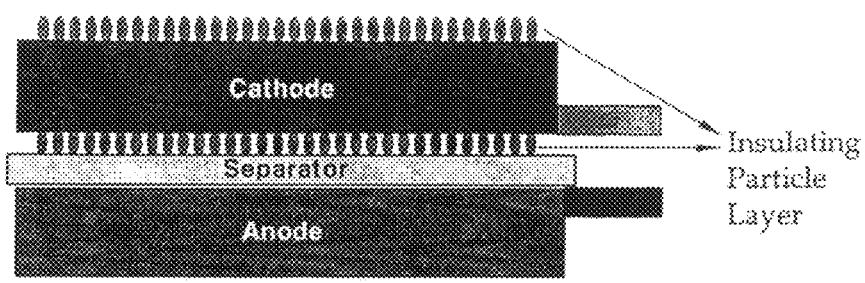
FIG. 2 is a sectional view showing the structure of a lithium secondary battery obtained by assembling electrodes with a separator via hot fusion after distributing insulating powder onto an anode or a cathode.
Figure 2:
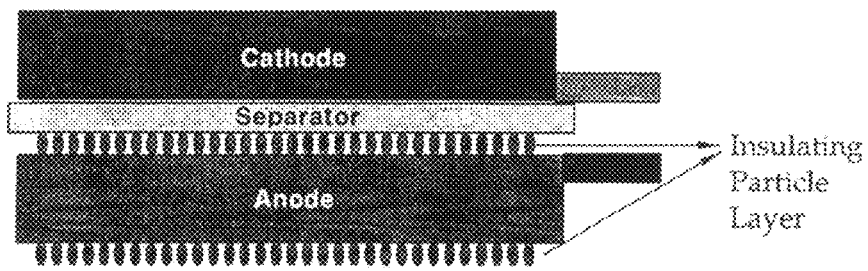

Reference will now be made in detail to the preferred embodiments of the present invention. It is to be understood that the following examples are illustrative only and the present invention is not limited thereto.

Example 1~3

Example 1: Manufacture of Lithium Secondary Battery

First, 90 wt % of $LiMn_2O_4$, 5 wt % of Super-P as a conductive agent and 5 wt % of PVDF (polyvinylidene difluoride) as a binder were mixed, and NMP (N-methyl pyrrolidone) was added thereto to provide slurry. Next, the slurry was coated onto aluminum (Al) foil, followed by drying at 130° C. to provide a cathode.

Then, 90 wt % of hard carbon as an anode active material, 9 wt % of PVDF as a binder and 1 wt % of Super-P was mixed, and NMP was added thereto to provide slurry. The slurry was coated onto copper (Cu) foil, followed by drying at 130° C. to provide an anode.

As an electrolyte, EC/EMC (ethyl carbonate/ethyl methyl carbonate) solution containing 1M $LiPF_6$ dissolved therein was used.

Before laminating the preformed cathode and anode with each other, $TiO_2$ insulating powder was uniformly scattered onto the surface of the anode in an amount of about 10 parts by weight by using a sieve vibration system. Next, both electrodes and a separator were laminated and the resultant laminate was passed through a roll laminator at 100° C. to compress the laminate. Then, the compressed laminates were stacked to form a bicell, which, in turn, was introduced into a battery casing. Finally, the preformed electrolyte was injected thereto.

Example 2

A lithium secondary battery was provided in the same manner as described in Example 1, except that $TiO_2$ insulating powder was scattered onto the surface of the cathode instead of the anode.

Example 3

A lithium secondary battery was provided in the same manner as described in Example 1, except that $TiO_2$ insulating powder was scattered onto the surface of the separator instead of the anode.

Example 4

(Manufacture of Electrodes for Full Cell)

A cathode and an anode, each disposed at the outermost part of the outermost full cell, were provided as single side-coated electrodes by coating electrode slurry merely onto one surface of aluminum foil. A cathode and an anode disposed at the inner part were provided as double side-coated electrodes by coating electrode slurry onto both surfaces of aluminum foil.

(Manufacture of Separator)

A multilayer polymer film was provided by using a microporous polypropylene film as a first polymer separator and polyvinylidene fluoride-chlorotrifluoroethylene copolymer 32008 available from Solvey Polymer Co. as a second gelled polymer.

(Manufacture of Full Cell Disposed at Inner Part)

A double side-coated cathode and anode were cut while leaving a tab portion. $TiO_2$ powder was scattered onto the cathode in an amount of about 10 parts by weight, and the separator was interposed between the cathode and the anode. Then, the resultant laminate was passed through a roll laminator at 100° C. to perform hot fusion between each electrode and the separator and to provide an inner full cell.

(Manufacture of Full Cell Disposed at Outermost Part)

A single side-coated cathode and anode were cut while leaving a tab portion. $TiO_2$ powder was scattered onto the cathode in an amount of about 10 parts by weight, and the separator was interposed between the cathode and the anode. Then, the resultant laminate was passed through a roll laminator at 100° C. to perform hot fusion between each electrode and the separator and to provide the outermost full cell.

(Lamination of Full Cells)

The full cells obtained as described above were stacked in the order of the outermost full cell, the inner full cell and the outermost full cell. At this time, the current collector of the single side-coated electrode was positioned at the outermost part. Then, $TiO_2$ powder was scattered onto the interface between the full cells in an amount of about 10 parts by weight, and the separator was interposed between the full cells. Then, the resultant laminate was passed through a roll laminator at 100° C. to perform hot fusion. The resultant electrode assembly was introduced into a battery casing, and the preliminarily formed electrolyte was injected thereto.

Comparative Example 1

A lithium secondary battery was provided in the same manner as described in Example 1, except that $TiO_2$ insulating powder was not scattered onto the surface of an electrode.

Experimental Example 1: Evaluation of Defects in Lithium Secondary Batteries

The following test was performed to evaluate generation of a short circuit and low-voltage defects in the lithium secondary batteries obtained according to Examples 1~3 and Comparative Example 1.

1-1. Evaluation of Short Circuit Generation

Electric resistance of each bicell was measured after the electrode lamination step during the manufacture of each battery to determine generation of a short circuit. Herein, the electric resistance of each bicell was measured between the cathode terminal and the anode terminal. An electric resistance of less than 100 Mohm was regarded as a short circuit. The results are shown in the following Table 1.

1-2. Evaluation of Low-Voltage Defect Generation

Each battery was subjected to the initial charge/discharge cycle by charging it to 4.2 V at 500 mA and discharging it to a terminal voltage of 2.5V at a current of 3000 mA. Next, each battery was subjected to five charge/discharge cycles including charging to a charge cut off voltage of 4.2V at a current of 3000 mA and discharging to a terminal voltage of 2.5V. After the fifth cycle, discharge capacity was measured. Then, the voltage of each battery was measured in a 50% charged state, and a voltage drop was measured after two weeks in a 50% charged state. After two weeks, a voltage drop of 20 mV or higher was regarded as a low-voltage defect.

After the test, it could be seen that the lithium secondary batteries according to Examples 1~3 showed a significantly reduced generation of a short circuit and low-voltage defect, as compared to the battery obtained via a conventional process according to Comparative Example 1 (see Table 1).

TABLE 1

|  | Short generation (%) | Low-voltage defect generation after assemblage (%) |
|---|---|---|
| Ex. 1 | 0.5 | 1.9 |
| Ex. 2 | 1.4 | 4.1 |
| Ex. 3 | 1.8 | 6.3 |
| Comp. Ex. 1 | 5.4 | 8.5 |

Experimental Example 2: Evaluation of Quality of Lithium Secondary Battery

The lithium secondary batteries obtained according to Examples 1~3 and Comparative Example 1 were compared to each other in terms of capacity.

Each battery was subjected to charge/discharge cycles in a range of 4.2V to 2.5V at a current of 1 C. The capacity of the battery using no insulating powder according to Comparative Example 1 at the fifth cycle was taken as 100%. The capacity of each of the batteries according to Examples 1~3 was compared to the capacity of the battery according to Comparative Example 1 to determine the percent capacity ratio (capacity %).

Additionally, each battery was charged to 100%, discharged at a rate of 1 C for 30 minutes to be set under SOC 50 state, and then allowed to rest for 1 hour. Herein, the final OCV after the 1-hour rest was taken as $V_1$. Next, a current was passed through each battery at a rate of 20 C for 10 seconds, and the voltage was taken as $V_2$. The electric resistance of each battery was calculated by using a variance in voltage ($\Delta V = V_1 - V_2$), on the basis of the formula of [resistance=$\Delta V/20CA$]. The percent capacity ratio and resistance of each battery are shown in the following Table 2.

After the test, it could be seen that the lithium secondary battery including insulating powder scattered onto an electrode and/or separator according to the present invention showed capacity and resistance comparable to those of the conventional battery (see Table 2).

TABLE 2

|  | Capacity (%) | Resistance (%) |
|---|---|---|
| Ex. 1 | 99.10 | 99.94 |
| Ex. 2 | 99.65 | 99.23 |
| Ex. 3 | 99.91 | 99.47 |
| Comp. Ex. 1 | 100 | 100 |

INDUSTRIAL APPLICABILITY

As can be seen from the foregoing, the method for manufacturing a lithium secondary battery, including a step of scattering insulating powder partially or totally onto the surface of a separator or the surface of at least one electrode facing to the separator according to the present invention, significantly reduces generation of an internal short circuit between both electrodes caused by internal or external factors during the assemblage of a battery and generation of low-voltage defects, and thus significantly improves yield of desired batteries.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:
1. A method for producing a lithium secondary battery, the method consisting of:
   (a) distributing or scattering an insulating material directly onto a surface of at least one of a preformed cathode, a preformed anode or a polymer film separator to form a layer consisting of the insulating material, wherein the insulating material consists of powder and is selected from the group consisting of MgO, $TiO_2$, $Li_4Ti_5O_{12}$, $ZrO_2$, $InSnO_2$, $Al_2O_3$, $SiO_2$, $GeO_2$, MoO, SnO, $Cr_2O_3$ and $Sb_2O_3$—$SnO_2$, wherein the insulating material partially covers the surface, and wherein the layer formed by the distributing or the scattering of the insulating material has a thickness of 20 nm-5 µm;
   (b) forming an electrode assembly having the preformed cathode, the preformed anode and the polymer film separator by interposing the polymer film separator between the preformed cathode and the preformed anode and fusing the polymer film separator, the preformed cathode and the preformed anode at a hot fusion temperature to form the electrode assembly after the distributing or the scattering of the insulating material onto the surface in step (a);
   (c) introducing the electrode assembly formed in step (b) into a casing and injecting an electrolyte;
   (d) sealing the casing to finish assembly of the battery;
   (e) optionally performing formation of the battery by repeating charge/discharge cycles after the assemblage of the battery in order to activate the battery; and
   (f) optionally performing aging of the battery to stabilize the activated battery.
2. The method as claimed in claim 1, wherein the insulating material has a particle diameter of 20 nm-1 µm.
3. The method as claimed in claim 1, wherein the distribution or the scattering of the insulating material directly onto the surface is via a fine net or sieve vibration system.
4. The method as claimed in claim 1, wherein the insulating material is used in an amount of 2 µg/cm²~50 mg/cm² per unit area.
5. The method as claimed in claim 1, wherein the hot fusion is performed at a temperature of 60° C.-100° C.
6. The method of claim 1, wherein the polymer film separator is a microporous polymer separator.

* * * * *